(12) United States Patent
Brown et al.

(10) Patent No.: US 8,046,734 B2
(45) Date of Patent: Oct. 25, 2011

(54) WORKFLOW DECISION MANAGEMENT WITH HEURISTICS

(75) Inventors: William A. Brown, Raleigh, NC (US); Richard William Muirhead, Tyler, TX (US); Francis Xavier Reddington, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/061,974

(22) Filed: Apr. 3, 2008

(65) Prior Publication Data

US 2008/0235706 A1 Sep. 25, 2008

Related U.S. Application Data

(63) Continuation of application No. 11/032,336, filed on Jan. 10, 2005, now abandoned.

(51) Int. Cl.
*G06F 9/44* (2006.01)
*G05B 11/01* (2006.01)
*G05B 13/02* (2006.01)

(52) U.S. Cl. .............. 717/104; 700/12; 700/19; 700/29; 700/32; 714/39; 719/320

(58) Field of Classification Search .................. None
See application file for complete search history.

(56) References Cited

U.S. PATENT DOCUMENTS

| | | | |
|---|---|---|---|
| 5,546,463 A | 8/1996 | Caputo et al. | |
| 5,572,438 A | 11/1996 | Ehlers et al. | |
| 5,745,864 A | 4/1998 | Hosoe et al. | |
| 5,768,284 A | 6/1998 | Cox | |
| 5,812,394 A * | 9/1998 | Lewis et al. | 700/17 |
| 5,825,857 A | 10/1998 | Reto et al. | |
| 5,889,918 A | 3/1999 | Sakazaki et al. | |
| 5,978,371 A | 11/1999 | Mason, Jr. et al. | |
| 6,100,817 A | 8/2000 | Mason, Jr. et al. | |
| 6,108,775 A | 8/2000 | Shiell et al. | |
| 6,170,002 B1 | 1/2001 | Ouchi | |
| 6,192,282 B1 | 2/2001 | Smith et al. | |
| 6,453,687 B2 | 9/2002 | Sharood et al. | |
| 6,535,110 B1 * | 3/2003 | Arora et al. | 340/310.11 |
| 6,768,809 B2 | 7/2004 | Rhoads et al. | |
| 6,847,892 B2 | 1/2005 | Zhou et al. | |
| 6,865,427 B2 | 3/2005 | Brown et al. | |
| 6,865,428 B2 | 3/2005 | Gonzales et al. | |
| 6,912,429 B1 | 6/2005 | Bilger | |
| 6,934,684 B2 | 8/2005 | Alpdemir et al. | |
| 7,016,888 B2 | 3/2006 | Slemmer et al. | |

(Continued)

OTHER PUBLICATIONS

Final Office Action Dated Nov. 12, 2009 in U.S. Appl. No. 10/844,636.

(Continued)

*Primary Examiner* — Michael J Yigdall
(74) *Attorney, Agent, or Firm* — Edward J. Lenart; Mark Vallone; Biggers & Ohanian, LLP

(57) ABSTRACT

Methods, systems, and computer program products are provided for workflow decision management. Embodiments typically include maintaining a device state history; identifying a device usage pattern in dependence upon the device state history; identifying a derived scenario in dependence upon the device usage pattern; and selecting a heuristic in dependence upon the derived scenario. In typical embodiments, the heuristic has a tolerance. Embodiments also include identifying a workflow in dependence upon the selected heuristic and executing the workflow in dependence upon the tolerance.

27 Claims, 6 Drawing Sheets

U.S. PATENT DOCUMENTS

| | | | |
|---|---|---|---|
| 7,103,420 | B2 | 9/2006 | Brown et al. |
| 7,289,966 | B2 | 10/2007 | Ouchi |
| 7,315,542 | B2 | 1/2008 | Gil et al. |
| 7,506,195 | B2 | 3/2009 | Takahashi et al. |
| 2001/0049761 | A1 | 12/2001 | Huang |
| 2002/0087534 | A1 | 7/2002 | Blackman et al. |
| 2002/0123928 | A1 | 9/2002 | Eldering et al. |
| 2003/0009507 | A1 | 1/2003 | Shum |
| 2003/0023728 | A1 | 1/2003 | Yaung |
| 2003/0037141 | A1 | 2/2003 | Milo et al. |
| 2003/0103232 | A1 | 6/2003 | Twede |
| 2003/0147516 | A1 | 8/2003 | Lawyer et al. |
| 2003/0154123 | A1 | 8/2003 | Subbloie et al. |
| 2003/0187984 | A1 | 10/2003 | Banavar et al. |
| 2003/0233155 | A1 | 12/2003 | Slemmer et al. |
| 2004/0015241 | A1 | 1/2004 | Brown et al. |
| 2004/0015242 | A1 | 1/2004 | Brown et al. |
| 2004/0083305 | A1 | 4/2004 | Wang et al. |
| 2004/0236819 | A1 | 11/2004 | Anati et al. |
| 2004/0243699 | A1 | 12/2004 | Koclanes et al. |
| 2005/0065753 | A1 | 3/2005 | Bilgus |
| 2005/0212759 | A1 | 9/2005 | Marvit et al. |
| 2005/0267788 | A1 | 12/2005 | Brown et al. |
| 2006/0059107 | A1 | 3/2006 | Elmore et al. |
| 2006/0155847 | A1 | 7/2006 | Brown et al. |
| 2006/0155848 | A1 | 7/2006 | Brown et al. |
| 2006/0156276 | A1 | 7/2006 | Brown et al. |
| 2006/0248145 | A1 | 11/2006 | Kamakar et al. |
| 2007/0005623 | A1 | 1/2007 | Self et al. |
| 2007/0060976 | A1 | 3/2007 | Denzene et al. |
| 2007/0061322 | A1 | 3/2007 | Nemoto |
| 2007/0098013 | A1 | 5/2007 | Brown et al. |
| 2007/0100884 | A1 | 5/2007 | Brown et al. |
| 2007/0100990 | A1 | 5/2007 | Brown et al. |
| 2007/0101007 | A1 | 5/2007 | Brown et al. |
| 2007/0116013 | A1 | 5/2007 | Brown et al. |
| 2008/0178193 | A1 | 7/2008 | Brown et al. |
| 2008/0235706 | A1 | 9/2008 | Brown et al. |

OTHER PUBLICATIONS

Final Office Action Dated Nov. 2, 2009 in U.S. Appl. No. 12/061,760.
Final Office Action Dated Aug. 17, 2009 in U.S. Appl. No. 11/264,714.
Notice of Allowance Dated Sep. 1, 2009 in U.S. Appl. No. 11/264,806.
Office Action Dated Sep. 1, 2009 in U.S. Appl. No. 11/264,736.
Final Office Action Dated Sep. 15, 2009 in U.S. Appl. No. 11/264,717.
Final Office Action Dated Nov. 2, 2009 in U.S. Appl. No. 11/264,716.
Pakkam; Performance Evaluation of the Consumer Electronic Bus; Sep. 4, 1990; IEEE; pp. 949-953.
Heierman, Edwin O., III and Diane J. Cook, "Improving Home Automation by Discovering Regularly Occurring Device Usage Patterns," Proceedings of the Third IEEE International Conference on Data Mining, Nov. 19-22, 2003, pp. 537-540.
Office Action Dated Dec. 27, 2007 in U.S. Appl. No. 10/844,636.
Office Action Dated Jul. 2, 2007 in U.S. Appl. No. 10/844,636.
Final Office Action Dated Jul. 9, 2008 in U.S. Appl. No. 10/844,636.
Office Action Dated Mar. 23, 2009 in U.S. Appl. No. 10/844,636.
Office Action Dated Mar. 11, 2008 in U.S. Appl. No. 11/032,334.
Final Office Action Dated Sep. 15, 2008 in U.S. Appl. No. 11/032,334.
Office Action Dated Aug. 26, 2008 in U.S. Appl. No. 11/032,336.
Final Office Action Dated Feb. 18, 2009 in U.S. Appl. No. 11/032,336.
Office Action Dated Apr. 27, 2009 in U.S. Appl. No. 11/032,337.
Office Action Dated May 27, 2009 in U.S. Appl. No. 11/032,337.
Office Action Dated Apr. 14, 2008 in U.S. Appl. No. 11/264,714.
Final Office Action Dated Oct. 17, 2008 in U.S. Appl. No. 11/264,714.
Office Action Dated Feb. 27, 2009 in U.S. Appl. No. 11/264,714.
Office Action Dated Dec. 8, 2008 in U.S. Appl. No. 11/264,806.
Office Action Dated Sep. 16, 2008 in U.S. Appl. No. 11/264,736.
Office Action Dated Mar. 3, 2009 in U.S. Appl. No. 11/264,736.
Office Action Dated Mar. 16, 2009 in U.S. Appl. No. 11/264,717.
Office Action Dated Apr. 3, 2009 in U.S. Appl. No. 11/264,716.
Office Action Dated Apr. 1, 2009 in U.S. Appl. No. 12/061,760.
Final Office Action, U.S. Appl. No. 11/264,736, Feb. 22, 2010.
Final Office Action, U.S. Appl. No. 11/264,714, May 6, 2010.
Office Action, U.S. Appl. No. 12/061,760, May 13, 2010.
Office Action, U.S. Appl. No. 10/844,636, Jun. 11, 2010.
Office Action, U.S. Appl. No. 12/061,974, Jul. 20, 2010.
Notice Of Allowance, U.S. Appl. No. 11/264,716, Jul. 29, 2010.
Office Action, U.S. Appl. No. 11/264,736, Aug. 5, 2010.
Final Office Action, U.S. Appl. No. 10/844,636, USPTO Mail Date Nov. 4, 2010.
Office Action, U.S. Appl. No. 11/264,714, USPTO Mail Date Dec. 23, 2010.
Office Action, U.S. Appl. No. 11/264,736, USPTO Mail Date Dec. 23, 2010.
Notice of Allowance, U.S. Appl. No. 11/264,716, USPTO Mail Date Jan. 5, 2011.
Notice of Allowance, U.S. Appl. No. 12/061,974, USPTO Mail Date Dec. 28, 2010.
Final Office Action, U.S. Appl. No. 12/061,760, USPTO Mail Date Nov. 22, 2010.
Notice of Allowance, U.S. Appl. 12/061,974, USPTO Mail Date Mar. 3, 2011.
Notice of Allowance, U.S. Appl. No. 12/061,974, USPTO Mail Date Mar. 3, 2011.
Final Office Action, U.S. Appl. No. 11/264,714, USPTO Mail Date Jun. 17, 2011.
Office Action, U.S. Appl. No. 11/264,736, USPTO Mail Date Jul. 8, 2011.

* cited by examiner

| Device | Scenario | Device Threshold |
|---|---|---|
| 150 | 344 | 308 |
| Device ID ~ 302<br>Address ~ 304<br>Attribute ~ 306 | Device ID ~ 302<br>Scenario ID ~ 346<br>Workflow ID ~ 340<br>Description ~ 350 | Device ID ~ 302<br>Max ~ 310<br>Min ~ 312 |

| Device State | | User |
|---|---|---|
| 330 | Workflow | 374 |
| DeviceID ~ 302<br>DeviceState ID ~ 316<br>Description ~ 339 | 338<br>Workflow ID ~ 340<br>Sequence Number ~ 342 | User ID ~ 376<br>Role ID ~ 378 |

| Device State History | Workflow Session | User Session State |
|---|---|---|
| 314 | 362 | 382 |
| DeviceID ~ 302<br>DeviceState ID ~ 316<br>Value ~ 318<br>Time Stamp~ 320 | Workflow Session ID ~ 364<br>Workflow ID ~ 340<br>User Session State ID ~ 366<br>Msg ID ~ 368<br>User ID ~ 370<br>Role ID ~ 372 | Session State<br>ID ~ 384<br>Msg ID~ 386<br>User ID ~ 376<br>Role ID ~ 378 |

| Device Usage | Derived Scenario |
|---|---|
| 328 | 352 |
| Usage ID ~ 376<br>Device ID ~ 302<br>DeviceState ID ~ 326<br>Value ~ 318 | Derived Scenario ID ~ 354<br>Description ~ 358 |

| Usage | Tolerance |
|---|---|
| 332 | 360 |
| Usage ID ~ 334<br>Description~ 336 | Tolerance Level ID ~ 362 |

FIG. 3

WORKFLOW DECISION MANAGEMENT WITH HEURISTICS

CROSS-REFERENCE TO RELATED APPLICATION

This application is a continuation application of and claims priority from U.S. patent application Ser. No. 11/032,336, filed on Jan. 10, 2005.

BACKGROUND OF THE INVENTION

1. Field of the Invention

The field of the invention is data processing, or, more specifically, methods, systems, and products for workflow decision management.

2. Description of Related Art

Conventional networks contain various networked devices. User's often use the various devices, or adjust particular settings of the devices, in accordance with consistent patterns and scenarios of device usage. Despite routinely using devices according to these consistent patterns and scenarios of device usage, conventional networked devices still often require user intervention to change attribute values of a device. It would be advantageous if there were a method of workflow decision management that used workflows to change in values of device attributes in a network in dependence upon identified patterns of usage and identified scenarios that did not require user intervention.

SUMMARY OF THE INVENTION

Methods, systems, and computer program products are provided for workflow decision management. Embodiments typically include maintaining a device state history, identifying a device usage pattern in dependence upon the device state history, identifying a derived scenario in dependence upon the device usage pattern, and selecting a heuristic in dependence upon the derived scenario. In typical embodiments, the heuristic has a tolerance. Embodiments also include identifying a workflow in dependence upon the selected heuristic and executing the workflow in dependence upon the tolerance.

In typical embodiments of the present invention, maintaining a device state history includes recording a plurality of attribute values for a device. In many embodiments, identifying a device usage pattern in dependence upon the device state history includes comparing the device state history with a plurality of device usage patterns records. In some embodiments, identifying a derived scenario in dependence upon the device usage pattern includes retrieving a derived scenario ID from a derived scenario table.

In typical embodiments, selecting a heuristic in dependence upon the derived scenario is carried out by reading a heuristic ID from a derived scenario record. In some embodiments, selecting a heuristic in dependence upon the derived scenario includes retrieving a heuristic ID from a heuristic table. In many embodiments, identifying a workflow in dependence upon the selected heuristic includes retrieving a workflow ID from a heuristic record.

In many embodiments, executing the workflow in dependence upon the tolerance is carried out by sending a message to a device. In some embodiments, executing the workflow in dependence upon the tolerance is carried out by calling a member method in a device class.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 3 is a block diagram illustrating exemplary data structures useful in implementing methods of workflow decision management according to aspects of the present invention.

DETAILED DESCRIPTION OF EXEMPLARY EMBODIMENTS

Introduction

Figure 1:
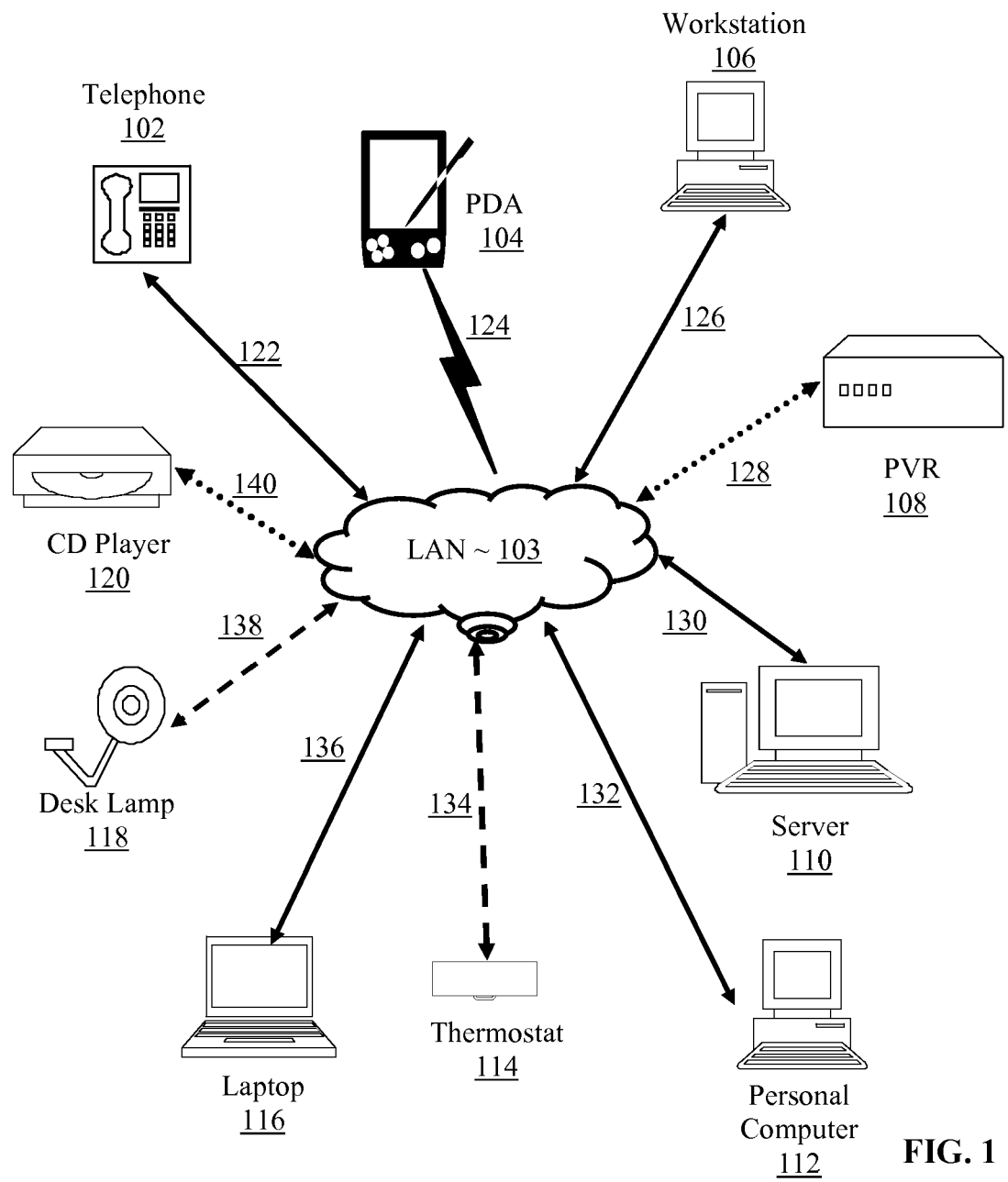
FIG. 1 depicts an exemplary data processing system capable of workflow decision management according to embodiments of the present invention.

The present invention is described to a large extent in this specification in terms of methods for workflow decision management. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"CEBus" is an abbreviation for Consumer Electronics Bus. CEBus is an open international standard for controlling devices over different media such as power line, radio frequency (RF), infrared (IR), coaxial cable, twisted pair, fiber optics and audio/video. The CEBus standard is promulgated by the Consumer Electronic Manufacturers Association (CEMA), a sector of the Electronics Industries Association (EIA) and described in 12 standards: the ANSI/EIA-600 series. The CEBus standard describes a physical design and topology of network media, a protocol for message generation, and a common application language ("CAL"). The CEBus specification is available for download at http://www.cebus.org.

CEBus provides a Common Application Language (CAL) defined in EIA 600.81 that uses an object-oriented model to provide interoperability between diverse devices in a networked environment. The CAL specification defines a set of classes that provide an interface to the internal operations of these disparate networked devices. If a function or feature cannot be mapped well to one of the classes defined in the CAL specification, the CAL specification has set aside a specific range of class identifiers for defining special classes.

CAL objects have two important attributes Instance Variables and Methods. Instance Variables contain information about a particular CAL object such as Boolean indications, numeric information, character-string information, and other data. Boolean Instance Variables can only be set to TRUE or FALSE. As the name implies, numeric Instance Variables are intended for storage of numbers. The character-string type Instance Variables provide storage of text. And other data-type Instance Variables provide storage of other information as a single-dimensioned array of one or more elements; each element containing the same number of one or more bytes.

Access to the information contained in CAL Instance Variables is accomplished through a set of member methods specific to that object. Examples of common methods include: setOn, setOff, setValue, getValue, setArray and getArray. Not all methods are appropriate for each Instance Variable type. For example, a setOn method is intended for manipulating Boolean Instance Variables and is therefore undefined for an Instance Variable of the character-string type. "Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a services gateway, PC, or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

The HomePlug protocol allows HomePlug-enabled devices to communicate across powerlines using Radio Frequency signals (RF). The HomePlug protocol uses Orthogonal Frequency Division Multiplexing (OFDM) to split the RF signal into multiple smaller sub-signals that are then transmitted from one HomPlug enabled-device to another HomePlug-enabled device at different frequencies across the powerline.

"HTTP" stands for 'HyperText Transport Protocol,' the standard data communications protocol of the World Wide Web.

"ID" abbreviates "identification" as used by convention in this specification with nouns represented in data elements, so that 'user ID' refers to a user identification and 'userID' is the name of a data element in which is stored a user identification.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"LonWorks" is a networking platform available from Echelong®. Lon Works is currently used in various network applications such as appliance control and lighting control. The LonWorks networking platform uses a protocol called "LonTalk" that is embedded within a "Neuron Chip" installed within Lon Works-enabled devices.

The Neuron Chip is a system-on-a-chip with multiple processors, read-write and read-only memory (RAM and ROM), and communication and I/O subsystems. The read-only memory contains an operating system, the LonTalk protocol, and an I/O function library. The chip has non-volatile memory for configuration data and for application programs, which can be downloaded over a LonWorks network to the device. The Neuron Chip provides the first 6 layers of the standard OSI network model. That is, the Neuron Chip provides the physical layer, the data link layer, the network layer, the transport layer, the session layer, and the presentation layer.

The Neuron Chip does not provide the application layer programming. Applications for LonWorks networks are written in a programming language called "Neuron C." Applications written in Neuron C are typically event-driven, and therefore, result in reduced traffic on the network.

"OSGI" refers to the Open Services Gateway Initiative, an industry organization developing specifications for services gateways, including specifications for delivery of service bundles, software middleware providing compliant data communications and services through services gateways. The Open Services Gateway specification is a java based application layer framework that gives service providers, network operator device makers, and appliance manufacturer's vendor neutral application and device layer APIs and functions.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

The "X-10" means the X-10 protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts which represent digital information.

In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

Workflow Decision Management With Derived Scenarios And Workflow Tolerances

Exemplary methods, systems, and products for workflow decision management, are now explained with reference to the accompanying drawings, beginning with FIG. 1. FIG. 1 depicts an exemplary data processing system capable of workflow decision management according to embodiments of the present invention. The exemplary system of FIG. 1 includes a number of workflow decision management compliant devices capable of implementing workflow decision management according to embodiments of the present invention that are connected for data communications through a local area network ("LAN")(103). In the example of FIG. 1, the exemplary workflow decision management compliant devices include a personal digital assistant ("PDA") (104), a computer workstation (106), a personal video recorder (108), a server (110), personal computer (112), a thermostat (114), a laptop (116), a desk lamp (118), a compact disc player (120), and a telephone (102) are coupled for data communications through a LAN. The network connection aspect of the architecture of FIG. 1 is only for explanation, not for limitation. In fact, systems for workflow decision management according to embodiments of the present invention may implemented with LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, the PDA (104) is coupled for data communications to the LAN (103) through a wireless link (124). The Workstation (106), the server (110), the personal computer (112), the laptop (116), and the telephone (102) are coupled for data communications to the LAN through twisted pair wireline connections (126, 130, 132, 136, 122). The personal video recorder (108) and the compact disc player (120) are coupled for data communications to the LAN through a coaxial cable wireline connection (128, 140). The thermostat (114) and the desk lamp (118) are coupled for data communications to the LAN through a powerline connection (134, 138).

The exemplary devices of FIG. 1 are capable of reporting current values of supported device attributes and the exemplary devices of FIG. 1 are also capable of receiving messages from other devices instructing the device to change values of supported attributes. The exemplary system of FIG. 1 is capable generally of maintaining a device state history; identifying a device usage pattern in dependence upon the device state history, identifying a derived scenario in dependence upon the device usage pattern, and selecting a heuristic in dependence upon the derived scenario. The heuristic typically has a tolerance. The system of FIG. 1 is also capable generally of identifying a workflow in dependence upon the selected heuristic and executing the workflow in dependence upon the tolerance.

A device state history is a data structure containing the history of the values of one or more attributes of one or more devices. In the example of FIG. 1, each device may maintain its own device state history and store the device history in computer memory installed on the device or single device state history of all the devices in the network maybe maintained in computer memory accessible to application programming implementing workflow decision management that is installed on one or more devices.

A device usage pattern is typically implemented as a data structure representing a predetermined pattern of device usage for one or more devices. That is, a data structure representing a pattern of device usage. A device usage pattern may represent a pattern of usage of a single device or a pattern of usage of more than one device. The system of FIG. 1 typically identifies a device usage pattern in dependence upon the device state history by searching a plurality of stored device usage records for a device usage record that matches recent entries in the device state history.

The system of FIG. 1 is also capable of identifying a derived scenario in dependence upon the identified device usage pattern. A derived scenario is typically implemented as a data structure representing a particular state of devices in a networked environment. Derived scenarios are created in dependence upon actual past device usage within the networked environment and such derived scenarios often represent scenarios of device usage of more than one device. The system of FIG. 1 typically identifies a derived scenario by retrieving a derived scenario ID from a derived scenario table in dependence upon the identified device usage pattern ID.

The system of FIG. 1 is also capable of identifying a heuristic in dependence upon the derived scenario. A heuristic represents a simplified solution directed at administering devices according to a particular derived scenario. That is, a heuristic is a data structure representing an approximate solution to a particular state of devices in a networked environment comprising the scenario.

The system of FIG. 1 is also capable of identifying a workflow in dependence upon the heuristic and executing the workflow. A workflow is software implementing a device controlling action that when executed changes the values of one or more attributes of one or more devices. Executing workflows typically includes calling member methods in a CAL object for a device, downloading an OSGi bundle to a device, calling member methods in a device class, sending a message to a device, or any other method of executing a workflow as will occur to those of skill in the art.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example, CEBus, X-10, LonTalk, HomePlug, HAVi, TCP/IP, HTTP, WAP, and others as will occur to those of skill in the art. Various embodiments of the present invention may also be implemented in various computer environments such as for example CEBus, OSGi, and others that will occur to those of skill in the art. Although much of the present specification describes exemplary embodiments of the present invention with particular reference to CEBus, the such descriptions are for explanation not for limitation. In fact, many environments and frameworks support workflow decision management according to the present invention such as, for example, CEBus, HAVi, HomePlug, LonWorks, X-10, OSGi, as well as others that will occur to those of skill in the art, and all such environments and frameworks are within the scope of the present invention.

Workflow decision management in accordance with the present invention is generally implemented with automated computing machinery installed on one or more workflow decision management compliant devices. For further explanation, FIG. 2 sets forth a block diagram of an exemplary device (150) useful in implementing workflow decision management according to embodiments of the present invention. The device (150) of FIG. 2 includes at least one computer processor (156) or 'CPU' as well as random access memory (168) ("RAM"). Stored in RAM (168) is an operating system (154). Operating systems useful in computers according to embodiments of the present invention include Unix, Linux, Microsoft NT™, and many others as will occur to those of skill in the art. Operating system (154) in the example of FIG. 2 is shown in RAM (168), but many components of an operating system typically are stored in non-volatile memory (166) also.

Also stored in RAM is a workflow decision management application (162). The workflow decision management application is application computer programming generally capable of maintaining a device state history, identifying a device usage pattern in dependence upon the device state history, and identifying a derived scenario in dependence upon the device usage pattern. The workflow decision management application is also generally capable of selecting a heuristic in dependence upon the derived scenario. The heuristic typically has a tolerance governing the execution of workflows. The exemplary devices of FIG. 2 are also capable of identifying a workflow in dependence upon the derived scenario; and executing the workflow in dependence upon the tolerance. Methods of workflow decision management in accordance with the present invention can be implemented using many programming languages including CAL, OSGi, Java, C++, Smalltalk, C, Pascal, Basic, COBOL, Fortran, and so on, as will occur to those of skill in the art.

Figure 2:
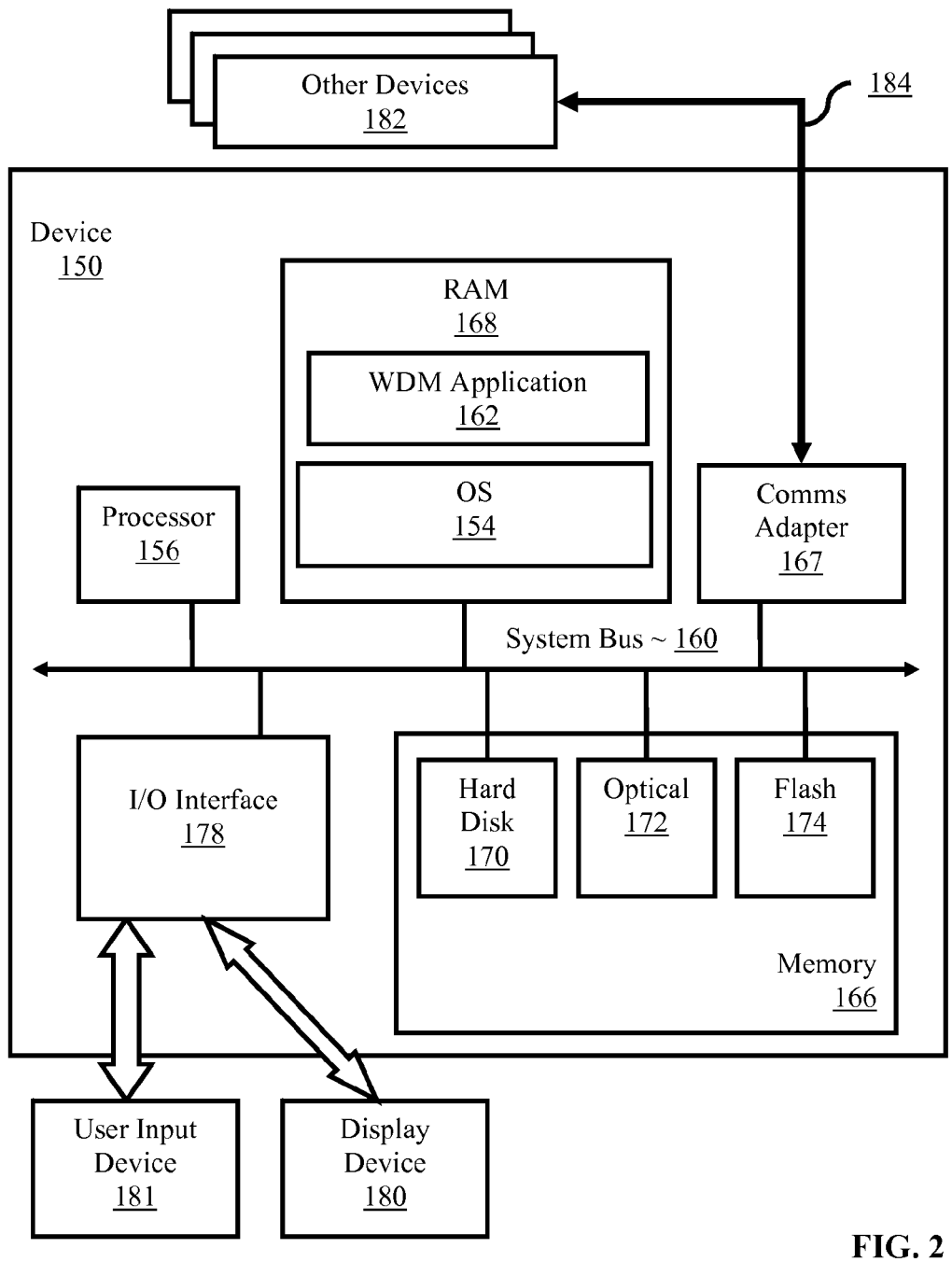
FIG. 2 sets forth a block diagram of an exemplary device useful in implementing workflow decision management according to embodiments of the present invention.

The device (150) of FIG. 2 includes non-volatile computer memory (166) coupled through a system bus (160) to processor (156) and to other components of the device (150). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary device (150) of FIG. 2 includes a communications adapter (167) for implementing connections for data communications (184), including connections through networks, to other workflow management compliant devices (182), including servers, other workflow management client devices, and others as will occur to those of skill in the art. Communications adapters implement the hardware level of connections for data communications through which local devices and remote devices or servers send data communications directly to one another and through networks. Examples of communications adapters useful for workflow decision management according to embodiments of the present invention include modems for wired dial-up connections, Ethernet (IEEE 802.3) adapters for wired LAN connections, and 802.11b adapters for wireless LAN connections.

The example device of FIG. 2 includes one or more input/output interface adapters (178). Input/output interface adapters in workflow management compliant devices implement user-oriented input/output through, for example, software drivers and computer hardware for controlling output to display devices (180) such as computer display screens, as well as user input from user input devices (181) such as keyboards and mice.

Figure 4:
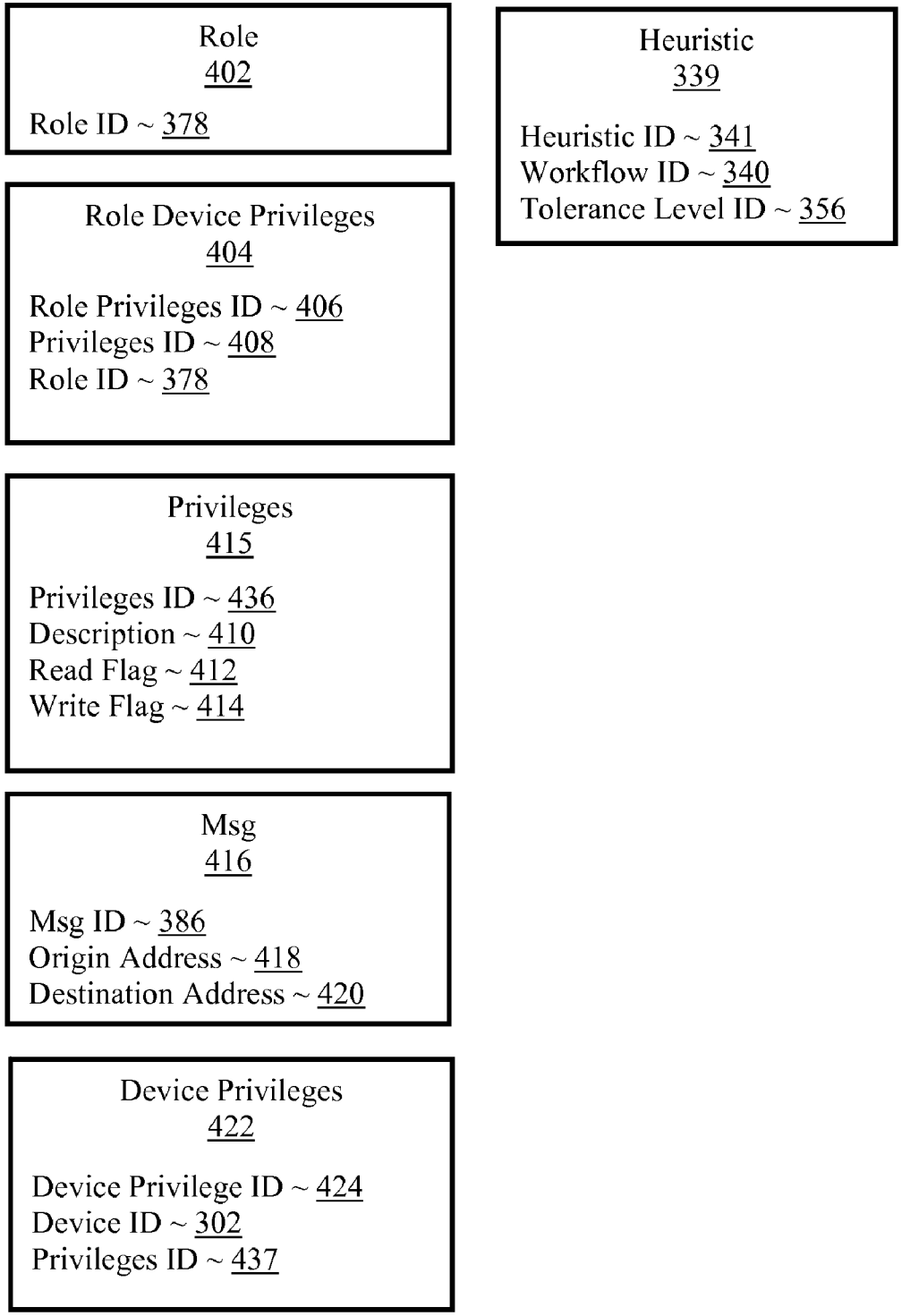
FIG. 4 is a block diagrams illustrating more exemplary data structures useful in implementing methods of workflow decision management according to aspects of the present invention

FIGS. 3 and 4 are block diagrams illustrating exemplary data structures useful in implementing methods of workflow decision management according to aspects of the present invention. In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases."

The example of FIG. 3 includes a device record (150) that represents a workflow decision management compliant device in accordance with the present invention. The exemplary device record (150) includes a device ID field (302) uniquely identifying the device. The exemplary device record (150) also includes an address field (304) containing the network address of the device. The exemplary device record (150) includes an attribute field (306). The attribute field contains the value of a particular attribute of a device indicating a device state such as on, off, a volume setting, and so on. Although only one attribute field is shown in the example of FIG. 3, this for simplicity of explanation. Many workflow decision management compliant devices support more than one attribute as will occur to those of skill in the art.

The example of FIG. 3 includes an exemplary device state record (330) that represents the allowable device states of a particular device. The device state record includes a device ID field (302) uniquely identifying the device for which the device state record represents acceptable device states. The device state record (330) also includes a device state ID field (316) uniquely identifying the device state. The device state record (330) also includes a description field (339) containing a description of the acceptable states or attribute values of the device.

The example of FIG. 3 includes a devices state history (314). The device state history is a data structure containing the history of the state of one or more devices. That is, the current as well as past values of attributes of a device. Records in the exemplary device state history (314) include a device ID (302) uniquely identifying the device for which the device state is recorded. Records of the exemplary device state history also include a device state ID field (316) uniquely identifying acceptable device states for the device. Records of the exemplary device state history (314) include a value field (318) containing the value of a particular attribute of the device. As stated above, typical devices support more than one attribute and therefore typical records of device state histories include a plurality of value fields containing the values of the supported attributes. Records of the exemplary device state history include a time stamp field (320) containing date and time information identifying the date and time that a particular device attribute of a particular device had a particular value.

The example of FIG. 3 includes a device usage record (328) that represents a predetermined pattern of device attributes for a device. That is, a device usage is a data structure used to identify whether the states of the devices in a particular networked environment conform to a predetermined pattern. To determine whether the state of current devices in a particular networked environment conform to a predetermined pattern, recent entries in the device state history compared with a plurality of device usage. If the comparison results in a match, it is inferred that the state of the devices in the particular networked environment conform to a predetermined pattern.

The exemplary devices usage (328) includes a usage ID (376) uniquely identifying a particular predetermined pattern of device usage. The exemplary device usage of FIG. 3 includes a device ID (302) uniquely identifying a particular device. The device usage (328) also includes a device state ID (326) uniquely identifying the acceptable device states for the particular device. The exemplary device usage (328) includes a value field (318) containing the value of a particular supported attribute of the device.

The example of FIG. 3 includes a usage record (332) that identifies and describes a particular pattern of device usage in the networked environment. The usage record (332) includes usage ID (334) that uniquely identifies the pattern of device usage, and a description field (336) that contains a description of the pattern of device usage represented by the usage record (332).

The example of FIG. 3 includes a scenario record (344) that represents a particular scenario of device usage consistent with an identified predetermined device usage pattern. Scenarios (344) are predetermined and predefined generally from many users in many networked environments. That is, they are not created from the actual device usage in the networked domain in which they are implemented. When the current states of a device conform to a predetermined pattern of device usage, the current states of a device may also conform to one of a plurality of scenarios. The exemplary scenario record (344) of FIG. 3 includes a scenario ID field (346) uniquely identifying the scenario. The exemplary scenario record (344) of FIG. 3 includes a workflow ID (340) identifying a workflow for execution when the current device states in a particular networked environment identify a scenario. Although the scenario record of FIG. 3 includes a single workflow ID field, this for simplicity of explanation, not for limitation. In many embodiments of the present invention, a particular scenario supports the execution of more than one workflow. The scenario (344) of FIG. 3 also contains a description field (350) that contains a description of the scenario.

The example of FIG. 3 includes a workflow record (338) that represents a particular device controlling action or a set of device controlling actions. A workflow is software implementing a device controlling action that when executed changes the values of one or more attributes of one or more devices in accordance with the present invention. The exemplary workflow record (338) includes a workflow ID (340) uniquely identifying the workflow. The exemplary workflow record (338) of FIG. 3 also includes a sequence field (342) identifying whose value is used to execute this workflow in a particular sequence of execution of a plurality of workflows. That is, when more than one workflow is executed for a scenario, the value of the sequence field is used to sequence the execution of the plurality of workflows. Workflows can be implemented using CAL, OSGi, Java, C++, Smalltalk, C, Pascal, Basic, COBOL, Fortran, and so on, as will occur to those of skill in the art.

The example of FIG. 3 includes a workflow session (362) that represents an instance of an executed workflow. The exemplary workflow session (362) includes a workflow session ID (364) uniquely identifying the workflow session and a workflow ID (340) identifying the executed workflow. The exemplary workflow session also includes a user session state ID (366) uniquely identifying the particular user session for which the workflow is executed. The exemplary workflow session also includes a message ID (368) identifying a message sent to a device to effect the workflow. That is the message send to a device instructing the device to change the value of a particular attribute. Sending such messages to the device, in some embodiments, effect changes in device status and therefore, carry out the workflow. The exemplary workflow session (362) includes a user ID (370) identifying the user on whose behalf the workflow is executed and a role ID field (372) identifying the security role of the user.

The example of FIG. 3 includes a derived scenario (352) that represents a particular scenario of device usage in the networked domain. Derived scenarios are created in dependence upon the actual device usage within the networked environment. Derived scenarios (352) have two important distinctions from scenarios (344). First, the derived scenarios are created in dependence upon the device usage of the devices within the networked environment and therefore reflect scenarios of device usage of the particular networked environment from which they are derived rather than canned or off the shelf scenarios. Second, derived scenarios have an associated tolerance (360) which is a rule set that governs the execution of workflows executed in dependence upon identifying the derived scenario.

The exemplary derived scenario (352) of FIG. 3 includes a derived scenario ID field (354) uniquely identifying the derived scenario. The derived scenario (352) record contains a description field (358) containing a description of the derived scenario. The example of FIG. 3 includes a tolerance record (360) that represents a rule set governing the execution of a workflow executed in dependence upon a selected heuristic. Often a tolerance is a subset of the range of acceptable attribute values that a device supports. For example, a thermostat may support attribute values that will, if set, eventually damage either the thermostat itself or other devices. A tolerance is therefore often designed to govern the execution of workflows such that device usage is not harmful to devices within the networked environment. The exemplary tolerance (360) of FIG. 3 includes a tolerance level ID field (362) uniquely identifying the tolerance.

The example of FIG. 3 includes a device threshold record (308) that represents the threshold minimum and threshold maximum attribute values that device will support. The exemplary device threshold record (308) of FIG. 3 includes a device ID (302) identifying the device for which the thresholds are valid. The exemplary device threshold record also includes MAX field (310) containing the maximum attribute value that the device will support and a MIN field (312) that includes the minimum attribute value that the device will support.

The example of FIG. 3 includes a user record (374) representing a user for which workflows are performed to affect device status. Users according to aspects of workflow decision management of the present invention are not limited to human users, but also include processes as will occur to those of skill in the art. The exemplary user record (374) of FIG. 3 includes a user ID (376) uniquely identifying the user and a role ID (378) uniquely representing the role of the user. A role is security role for the user such as a systems administrator, a guest, and so on.

The example of FIG. 3 also includes a user session state (382) that represents a session for a user. A session for a user indications current workflow decision management being executed on the user's behalf. The user session state (382) of FIG. 3 includes a session state ID (384) that uniquely identifies the user session state and a message ID (386) that identifies a message sent to give effect to a particular workflow identified in a workflow session and executed on behalf of the user. The user session state also includes a user ID (376) identifying the user on whose behalf the workflow is executed and a role ID (378) identifying the role of the user.

FIG. 4 is a block diagram of more data structures useful in workflow decision management according to embodiments of the present invention. The example of FIG. 4 includes a role record (402) that represents a security role for a user. The exemplary role record (402) of FIG. 4 includes a role ID (378) that uniquely identifies a security role.

The example of FIG. 4 includes a role device privileges record (404) that representing the privileges assigned to a particular role for a device. For example, some security roles have only limited access to some devices. The role device privileges record (404) includes a role privileges ID field (406) uniquely identifying the role device privileges. The exemplary role device privileges record (404) of FIG. 4 includes a privileges ID (408) identifying an allowable privilege and a role ID (378) identifying a particular security role having the privilege.

The example of FIG. 4 includes a privilege record (415) representing a particular privilege. The exemplary privilege record (415) includes a privilege ID field (436) identifying the privilege and a description field (410) containing a description of the privilege. The exemplary privilege record (415) includes a read flag (412) and a write flag (414) containing a Boolean indication of read and write privileges. The example of FIG. 4 includes a message record (416) representing a message. The message record (416) includes a message ID field (386) uniquely representing the message. The example message (416) of FIG. 4 also includes an origin address field (418) containing the network address of the device originating the message and a destination address field (420) containing the network address of the device receiving the message.

The example of FIG. 4 includes a device privilege record (422) that represents an available privilege appropriate for a device. The exemplary device privilege record (422) of FIG. 4 includes a device privilege ID (424) uniquely identifying the device privilege and a device ID (302) identifying the device. The exemplary device privilege record (422) includes a privilege ID (437) identifying an privilege appropriate for the device.

The example of FIG. 4 includes a heuristic record (338). In computer science the term 'heuristic' typically means a simplified solution or an educated guess that reduces the search for solutions in domains that are difficult and poorly understood. Unlike algorithms, heuristics often do not guarantee optimal, or even feasible, solutions and are often used with no theoretical guarantee. In the case of workflow decision management according to embodiments of the present invention, a heuristic record represents a simplified solution directed at administering devices according to a particular derived scenario. That is, a heuristic is a data structure representing an approximate solution to a particular scenario. For example, a device usage pattern may demonstrate that a ceiling fan is operating at its maximum capacity and thermostat is set to a target temperature of 72 degrees Farenheit. However, the room temperature is over 80 degrees Farenheit. One derived scenario representing this device usage pattern may be that the temperature outside the window of the room is over 90 degrees Farenheit. In this specification, a heuristic is a data structure representing an approximate solution to the problem. In this example, a heuristic record representing 'cool the room' may have associated workflows that give effect to the heuristic by administering devices to cool the room, such as by calling member methods for the thermostat to reduce the thermostat setting to 68 degrees Farenheit.

The exemplary heuristic record of FIG. 4 includes a heuristic ID (341) uniquely identifying the heuristic. The exemplary heuristic record (339) of FIG. 4 includes a workflow ID field (340) identifying a workflow that when executed gives effect to the heuristic. The exemplary heuristic record of FIG. 4 also includes a tolerance ID (356) identifying an associated tolerance for workflows executed in dependence upon the heuristic. The workflow associated with the heuristic is executed in dependence upon the associated tolerances of the heuristic.

Figure 5:
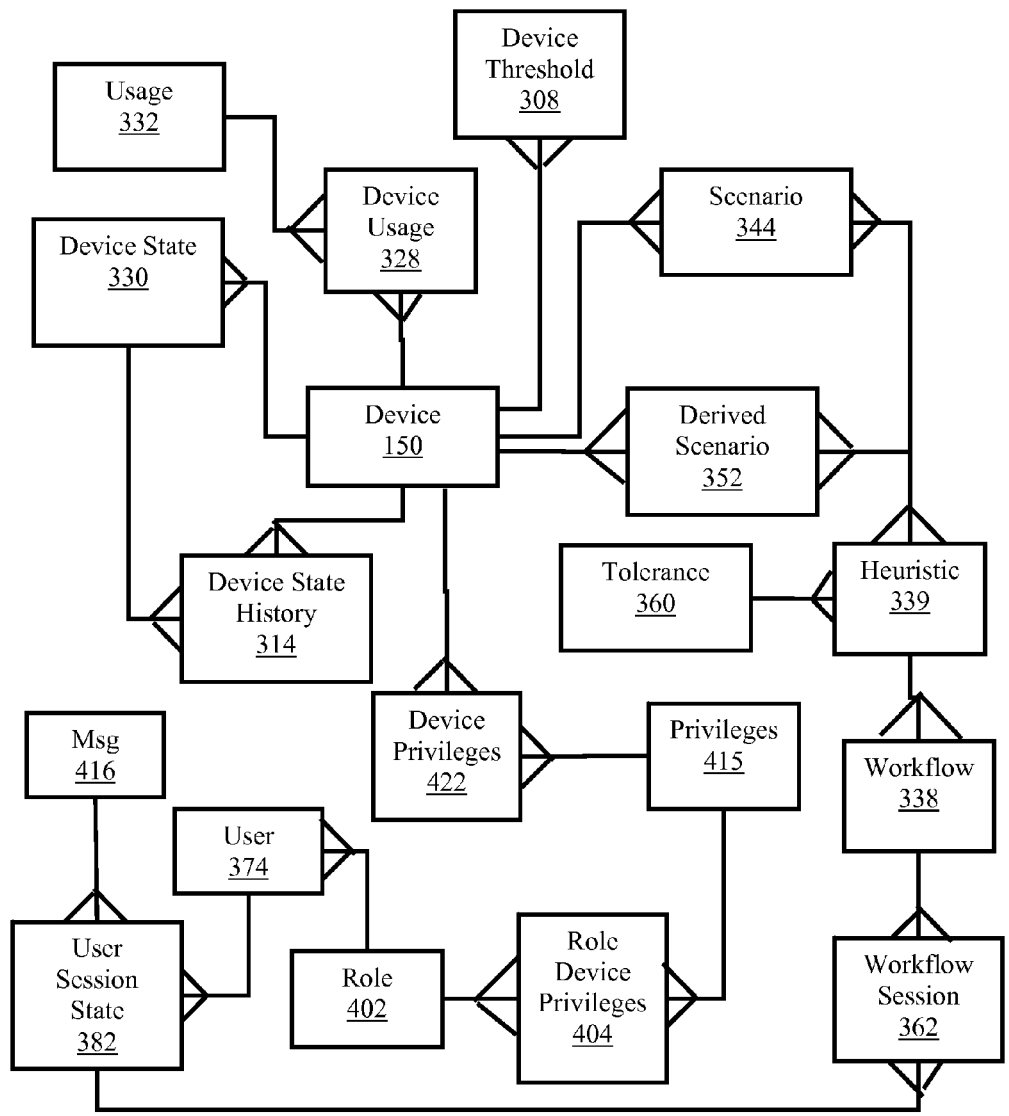
FIG. 5 is a block diagram illustrating an exemplary relationship among the data structures of FIGS. 3 and 4.

FIG. 5 is a block diagram illustrating an exemplary relationship among the data structures of FIGS. 3 and 4. In the example of FIG. 5, the device record is related one-to-many to the identified device usage record (328) through the device ID field (302 on FIG. 3) used as a foreign key. The identified device usage record (328) is related many-to-one to the usage record (332) through the usage ID field (376 on FIG. 3) used as a foreign key. The device record (150) is related one-to-many to the device threshold record (308) through the device ID field (302 on FIG. 3) used as a foreign key.

In the example of FIG. 5, the device record (150) is related one-to-many to the device state record (330) through the device ID field (302 on FIG. 3) used as a foreign key. The device state record (330) is related one-to-many to the device state history record (314) through the device state ID field (316 on FIG. 3) used as a foreign key. The device state history record (314) is related many-to-one to the device record (150) through the device ID field (302 on FIG. 3) used as a foreign key.

In the example of FIG. 5, the device record (150) is related one-to-many to the scenario record (344) through the device ID field (302 on FIG. 3) used as a foreign key. The scenario record (344) is related many-to-many to the heuristic record (339) through the heuristic ID field (341 on FIG. 4). The heuristic record is related one-to-many to the workflow record (338) through a workflow ID field (340 on FIG. 3) used as a foreign key. The workflow record (338) is related one-to-many to the workflow session (362) through the workflow ID field (340 on FIG. 3) used as a foreign key.

In the example of FIG. 5, the device record (150) is related one-to-many to the derived scenario record (352) through the device ID field (302 on FIG. 3) used as a foreign key. The derived scenario record (352) is related many-to-many to the heuristic record (339) through the heuristic ID field (341 on FIG. 4). The heuristic record (339) is related many-to-one to the tolerance record (360) through the tolerance ID field (356 on FIG. 4) used as a foreign key.

In the example of FIG. 5, the device record (150) is related one to many with the device privileges record (422) through the device ID field (302 on FIG. 3) used as a foreign key. The device privileges record (422) is related many-to-one through to the privileges record (415) through the privilege ID field (437 on FIG. 4) used as a foreign key. The privileges record (415) is related one-to-many to the role device privileges record (404) through the privilege ID field (436 on FIG. 4) used as a foreign key. The role device privileges record (404) is related many-to-one to the role record (402) through a role field (378 on FIG. 4) used as a foreign key.

In the example of FIG. 5, the user record (374) is related many-to-one through to the role record (402) through the role ID field (378 on FIG. 4) used as a foreign key. The user record (374) is related to the user session state (382) one-to-many through the user ID field (376 on FIG. 3) used as a foreign key. In the example of FIG. 5, the user session state (382) is related many-to-one to the message record (416) through the message ID field (386 on FIG. 4) used as a foreign key. In the example of FIG. 5, the user session state (382) is related one-to-many to the workflow session (362) through the user session state ID (384 on FIG. 3) used as a foreign key.

Workflow Decision Management With Heuristics

Figure 6:
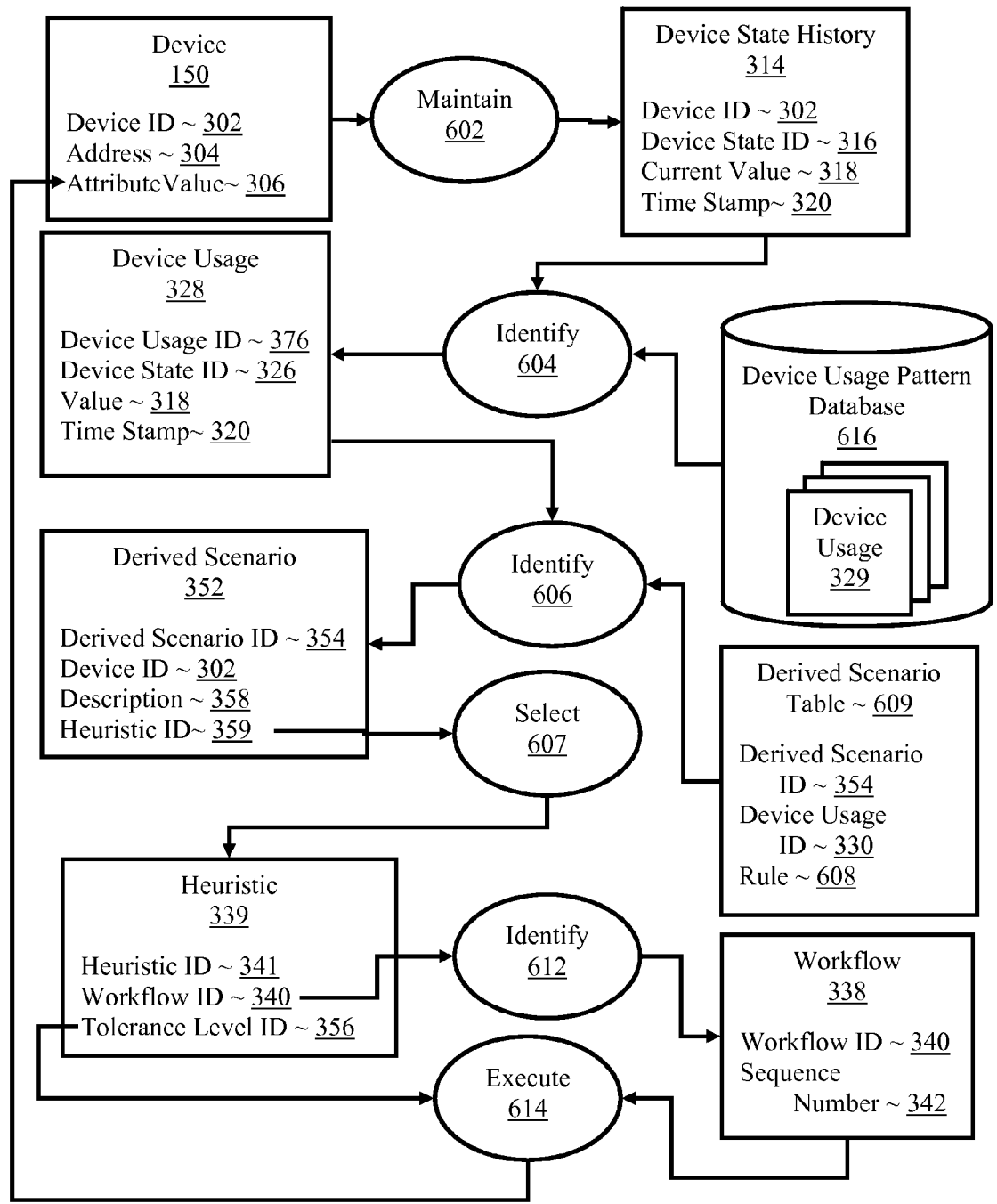
FIG. 6 sets forth a data flow diagram illustrating an exemplary method for workflow decision management.

FIG. 6 sets forth a data flow diagram illustrating an exemplary method for workflow decision management. The method of FIG. 6 includes maintaining (602) a device state history (314). As discussed above, the device state history is a data structure containing the history of the values of one or more attributes of one or more devices. A device state history for a single device can be maintained in computer memory on the device itself or a single device state history for many devices in the networked environment can be maintained in computer memory accessible to application programming implementing the method of FIG. 6.

In the method of FIG. 6, maintaining (602) a device state history (314) includes recording a plurality of attribute values (306) for a device (150). In the example of FIG. 6, each time an attribute value (306) of a device (150) is changed, the change is recorded by creating a new entry in a device state history. In some such embodiments, the latest entry in the device state history (314) represents the current state of the device. In some embodiments, workflow decision management devices are configured to report to application programming implementing a device state manager with each change in an attribute value and the device state manager creates a new entry in a device state history recording the change in attribute value.

The method of FIG. 6 also includes identifying (604) a device usage pattern (328) in dependence upon the device state history (314). As discussed above, a device usage record represents a predetermined pattern of device usage and includes a collection of device attribute values defining the device usage pattern. In the method of FIG. 6, identifying (604) a device usage pattern (328) in dependence upon the device state history (314) includes comparing the device state history (314) with a plurality of device usage patterns records (329). In the example of FIG. 6, a window of the entries of the device state history (314) representing recent device states is compared with device usage records (329) in a device usage pattern database (616) to identify a matching an identified device usage record (328). If such a matching an identified device usage record (328) exists, the current state of devices within a networked environment conform to a device usage pattern represented by the record.

As will occur to those of skill in the art, in typical embodiments, the values of the entries in the device state history do not have to be exactly the same as the values of the device usage records to identify a matching device usage record. In fact, the values of the entries of the device state history will often not be the exactly the same as the values of the device usage records when a matching record is identified. The degree to which the values of the entries in the device state history must be similar to the values of the device usage records to be considered a match will vary according to factors such as tolerances and methods used to used to compare the device state history with the device usage records, predefined tolerances for identifying a match, as well as other numerous factors that will occur to those of skill in the art.

The method of FIG. 6 also includes identifying (606) a derived scenario (352) in dependence upon the identified device usage pattern (328). As discussed above, a derived scenario (352) represents a particular scenario created in dependence upon actual device usage within the networked environment. Derived scenarios (352) have at least one important distinction from other canned scenarios or off-the-shelf scenarios. The derived scenarios are created in dependence upon the actual past device usage of the devices within the networked environment and therefore reflect scenarios of device usage of the particular networked environment.

In the method of FIG. 6, identifying (606) a derived scenario (352) in dependence upon the identified device usage pattern (328) further comprises retrieving a derived scenario ID from a derived scenario table. In the example of FIG. 6 a derived scenario table (609) includes a plurality of derived scenario IDs (354) indexed by device usage IDs (330) identifying predefined device usage patterns. Identifying (606) a derived scenario (352) in dependence upon the identified device usage pattern (328) therefore includes retrieving a derived scenario ID from a derived scenario table in dependence upon the device usage ID (330) of the identified device usage record (328).

In the method of FIG. 6, identifying (606) a derived scenario (352) in dependence upon the identified device usage pattern (328) includes identifying a derived scenario (352) in dependence upon a rule (608). A rule (608) governs the identification of a particular derived scenario among a plurality of derived scenarios when more than one derived scenario associated with a single device usage pattern exists. Consider the example of a user cooking in a networked kitchen. The states of the devices in a living room match a device usage pattern that the user is cooking. However, more than one scenario corresponds with the device usage pattern as the user may be cooking breakfast, cooking lunch, or cooking supper. An exemplary rule identifying a scenario is: If time of day is between 4:30 p.m. and 7:30 p.m. and device usage pattern identifies a cooking scenario, then user is cooking supper.

The method of FIG. 6 also includes selecting (607) a heuristic (339) in dependence upon the derived scenario (609). As discussed above, a heuristic record represents a simplified solution directed at administering devices according to a particular derived scenario. That is, a heuristic is a data structure representing an approximate solution to a particular state of devices in a networked environment. For example, a device usage pattern may be identified for a ceiling fan operating at its maximum capacity, a thermostat set to a target temperature of 72 degrees Fahrenheit, but the room temperature is still over 80 degrees Fahrenheit. One derived scenario representing this device usage pattern may be that the temperature outside the window of the room is over 90 degrees Fahrenheit. An example heuristic representing an approximate solution is implemented as a heuristic record representing 'cool the room.' Such a heuristic has associated one or more workflows that administer devices to carry out the approximate solution. Continuing with the same example, workflows that turn on a fan, draw shades, and lower the thermostat by one degree every 10 minutes carry out an approximate solution to cool the room. Those of skill in the art will recognize that the heuristics provide a vehicle to separate the problem from the solution and advantageously provide increased granularity in approaching executing workflows to administer devices in response to identifying derived scenarios.

In the method of FIG. 6, selecting (607) a heuristic (339) in dependence upon the derived scenario (352) includes reading a heuristic ID (359) from a derived scenario record (352). In other embodiments, selecting (607) a heuristic (339) in dependence upon the derived scenario (352) includes retrieving a heuristic ID from a heuristic table.

In the example of FIG. 6, the heuristic (339) also has an associated tolerance (356). As discussed above, a tolerance is a rule set governing the execution of workflows executed in dependence upon the selected heuristic. Often a tolerance is a subset of the range of acceptable attribute values that a device supports. Such tolerances are often designed to prevent the execution of workflows from damaging devices within the networked environment.

The method of FIG. 6 also includes identifying (612) a workflow (338) in dependence upon the heuristic (339). As discussed above, a workflow is software implementing a device controlling action that when executed changes the values of one or more attributes of one or more devices in accordance with the present invention. In the method of FIG. 6, identifying (612) a workflow (338) in dependence upon the selected heuristic comprises retrieving a workflow ID (340) from a heuristic record (339).

The method of FIG. 6 also includes executing (614) the workflow (338) in dependence upon the tolerance (356). As discussed above, a tolerance represents a rule governing the execution of a workflow. Often a tolerance is a subset of the range of acceptable attribute values that a device supports. Such tolerances are often designed to prevent the execution of workflows from damaging devices within the networked environment.

Consider the following example. A networked home has a number of devices that are used to cool the west wing of the home. These devices include a fan, an air conditioner, and automatic shades. However, the automatic shades are currently not working and they currently will not close properly. A workflow decision management application operating according to the present invention has identified a scenario within a home network demonstrating that the west wing of the home is too warm and identified an appropriate heuristic to cool the wing. The workflow decision management application identifies and executes a workflow associated with the heuristic to cool the wing that includes reducing the thermostat for the air conditioner, increasing fan speed and closing the automatic shades.

Because the automatic shades are not working properly, the workflow does not reduce the temperature in the west wing sufficiently and soon thereafter the scenario that the room is too hot is again identified and again the same heuristic is identified. The same workflow is again identified and executed. By providing a tolerance for the execution of the workflow that defines a minimum tolerance value allowed for the thermostat, the air conditioner is spared from being overworked to the point of damage. That is, tolerances provide some boundaries for the execution of workflow preventing devices from being damaged by unforeseen problems with the execution of a workflow, such as in this case, the automatic shades not working properly. These tolerance values are often designed as a subset of the actual values that devices support. Such design advantageously recognizes that devices often support attribute values that will ultimately lead to damaging the device.

In the method of FIG. 6, executing (614) the workflow (338) in dependence upon the tolerance (356) further comprises sending a message to a device instructing the device to change the value of an attribute. In some such examples, a device receiving such a method can effect the change in value of the device by calling a member methods in a device class representing the device such as, for example, SomeDeviceClass.setAtrribute( ) parameterized with an attribute value.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for workflow decision management, the method comprising:
   maintaining, by automated computing machinery, a device state history;
   identifying, by the automated computing machinery, a device usage pattern in dependence upon the device state history for one or more devices in a networked environment;
   identifying by the automated computing machinery a derived scenario in dependence upon the device usage pattern, the derived scenario created in dependence upon actual past device usage within the networked environment;
   selecting, by the automated computing machinery, a heuristic in dependence upon the derived scenario, the heuristic having a tolerance and comprising an approximate solution directed to administering devices in the networked environment to address the derived scenario;
   identifying, by the automated computing machinery, a workflow in dependence upon the selected heuristic; and
   executing, by the automated computing machinery, the workflow in dependence upon the tolerance.

2. The method of claim 1 wherein maintaining a device state history further comprises recording a plurality of attribute values for a device.

3. The method of claim 1 wherein identifying a device usage pattern in dependence upon the device state history further comprises comparing the device state history with a plurality of device usage patterns records.

4. The method of claim 1 wherein identifying a derived scenario in dependence upon the device usage pattern further comprises retrieving a derived scenario ID from a derived scenario table.

5. The method of claim 1 wherein selecting a heuristic in dependence upon the derived scenario further comprises reading a heuristic ID from a derived scenario record.

6. The method of claim 1 wherein selecting a heuristic in dependence upon the derived scenario further comprises retrieving a heuristic ID from a heuristic table.

7. The method of claim 1 wherein identifying a workflow in dependence upon the selected heuristic comprises retrieving a workflow ID from a heuristic record.

8. The method of claim 1 wherein executing the workflow in dependence upon the tolerance further comprises sending a message to a device.

9. The method of claim 1 wherein executing the workflow in dependence upon the tolerance further comprises calling a member method in a device class.

10. A computer system for workflow decision management, the computer system comprising:
a computer processor;
a computer readable memory and a computer readable, tangible storage device;
program instructions, stored on the storage device for execution by the computer processor via the memory to maintain, by automated computing machinery, a device state history;
program instructions, stored on the storage device for execution by the computer processor via the memory to identify, by the automated computing machinery, a device usage pattern in dependence upon the device state history for one or more devices in a networked environment;
program instructions, stored on the storage device for execution by the computer processor via the memory to identify, by the automated computing machinery, a derived scenario in dependence upon the device usage pattern, the derived scenario created in dependence upon actual past device usage within the networked environment;
program instructions, stored on the storage device for execution by the computer processor via the memory to select, by the automated computing machinery, a heuristic in dependence upon the derived scenario, the heuristic having a tolerance and comprising an approximate solution directed to administering devices in the networked environment to address the derived scenario;
program instructions, stored on the storage device for execution by the computer processor via the memory to identify, by the automated computing machinery, a workflow in dependence upon the selected heuristic; and
program instructions, stored on the storage device for execution by the computer processor via the memory to execute, by the automated computing machinery, the workflow in dependence upon the tolerance.

11. The system of claim 10 wherein the program instructions to maintain a device state history further comprises program instructions to record a plurality of attribute values for a device.

12. The system of claim 10 wherein the program instructions to identify a device usage pattern in dependence upon the device state history further comprises the program instructions to compare the device state history with a plurality of device usage patterns records.

13. The system of claim 10 wherein the program instructions to identify a derived scenario in dependence upon the device usage pattern further comprises the program instructions to retrieve a derived scenario ID from a derived scenario table.

14. The system of claim 10 wherein the program instructions to select a heuristic in dependence upon the derived scenario further comprises the program instructions to read a heuristic ID from a derived scenario record.

15. The system of claim 10 wherein the program instructions to select a heuristic in dependence upon the derived scenario further comprises the program instructions to retrieve a heuristic ID from a heuristic table.

16. The system of claim 10 wherein the program instructions to identify a workflow in dependence upon the selected heuristic further comprises the program instructions to retrieve a workflow ID from a heuristic record.

17. The system of claim 10 wherein the program instructions to execute the workflow in dependence upon the tolerance further comprises the program instructions to send a message to a device.

18. The system of claim 10 wherein the program instructions to execute the workflow in dependence upon the tolerance further comprises the program instructions to call a member method in a device class.

19. A computer program product for workflow decision management, the computer program product comprising a computer readable, tangible storage device and computer readable program instructions stored on the computer readable, tangible storage device, the computer-readable program instructions, when executed by a computer processor:
maintain, by automated computing machinery, a device state history;
identify, by the automated computing machinery, a device usage pattern in dependence upon the device state history for one or more devices in a networked environment;
identify, by the automated computing machinery, a derived scenario in dependence upon the device usage pattern, the derived scenario created in dependence upon actual past device usage within the networked environment;
select, by the automated computing machinery, a heuristic in dependence upon the derived scenario, the heuristic having a tolerance and comprising an approximate solution directed to administering devices in the networked environment to address the derived scenario;
identify, by the automated computing machinery, a workflow in dependence upon the selected heuristic; and
execute, by the automated computing machinery, the workflow in dependence upon the tolerance.

20. The computer program product of claim 19 wherein the computer-readable program instructions to maintain a device state history further comprises the computer-readable program instructions to record a plurality of attribute values for a device.

21. The computer program product of claim 19 wherein the computer-readable program instructions to identify a device usage pattern in dependence upon the device state history further comprises the computer-readable program instructions to compare the device state history with a plurality of device usage patterns records.

22. The computer program product of claim 19 wherein, the computer-readable program instructions to identify a derived scenario in dependence upon the device usage pattern further comprises the computer-readable program instructions to retrieve a derived scenario ID from a derived scenario table.

23. The computer program product of claim 19 wherein, the computer-readable program instructions to select a heuristic in dependence upon the derived scenario further comprises the computer-readable program instructions to read a heuristic ID from a derived scenario record.

24. The computer program product of claim 19 wherein, the computer-readable program instructions to select a heuristic in dependence upon the derived scenario further comprises the computer-readable program instructions to retrieve a heuristic ID from a heuristic table.

25. The computer program product of claim 19 wherein, the computer-readable program instructions to identify a workflow in dependence upon the selected heuristic further comprises the computer-readable program instructions to retrieve a workflow ID from a heuristic record.

26. The computer program product of claim 19 wherein the computer-readable program instructions to execute the workflow in dependence upon the tolerance further comprises the computer-readable program instructions to send a message to a device.

27. The computer program product of claim 19 wherein the computer-readable program instructions to execute the workflow in dependence upon the tolerance further comprises the computer-readable program instructions to call a member method in a device class.

* * * * *